(12) United States Patent
Yamaguchi

(10) Patent No.: US 10,715,069 B2
(45) Date of Patent: Jul. 14, 2020

(54) DISCHARGE CONTROL DEVICE

(71) Applicant: KEIHIN CORPORATION, Tokyo (JP)

(72) Inventor: Nobukatsu Yamaguchi, Sakura (JP)

(73) Assignee: KEIHIN CORPORATION, Tokyo (JP)

( * ) Notice: Subject to any disclaimer, the term of this patent is extended or adjusted under 35 U.S.C. 154(b) by 0 days.

(21) Appl. No.: 16/353,234

(22) Filed: Mar. 14, 2019

(65) Prior Publication Data

US 2019/0296669 A1 Sep. 26, 2019

(30) Foreign Application Priority Data

Mar. 22, 2018 (JP) .................. 2018-054702

(51) Int. Cl.
*H02P 21/05* (2006.01)
*H02P 27/12* (2006.01)

(52) U.S. Cl.
CPC .............. *H02P 21/05* (2013.01); *H02P 27/12* (2013.01); *H02P 2201/03* (2013.01); *H02P 2201/09* (2013.01)

(58) Field of Classification Search
CPC ....... H02P 21/05; H02P 27/12; H02P 2201/03
See application file for complete search history.

(56) References Cited

U.S. PATENT DOCUMENTS

2014/0225537 A1* 8/2014 Omata .................. H02P 21/26
318/400.02

FOREIGN PATENT DOCUMENTS

JP 3289567 B 6/2002

* cited by examiner

*Primary Examiner* — Cortez M Cook
(74) *Attorney, Agent, or Firm* — Cantor Colburn LLP

(57) ABSTRACT

A discharge control device performs discharging of a capacitor, in a state in which a battery is not connected to an inverter that drives a motor, by causing electric charges accumulated in the capacitor connected to the inverter to be consumed by windings of the motor. The discharge control device performs the discharging of the capacitor by sequentially generating command values for voltages applied to a α axis and a β axis while causing a voltage phase in an αβ stationary coordinate system having a rotation axis of a rotor of the motor as an origin and defined by the α axis and the β axis orthogonal to each other to be inverted in a predefined period.

4 Claims, 4 Drawing Sheets

FIG. 3A
| ADDRESS (ARRAY) | 0 | 1 | 2 | 3 | 4 | 5 | 6 | 7 |
|---|---|---|---|---|---|---|---|---|
| ANGLE $\theta_{\alpha\beta}$ [deg] | 90 | 270 | 270 | 90 | 180 | 0 | 0 | 180 |
FIG. 3B
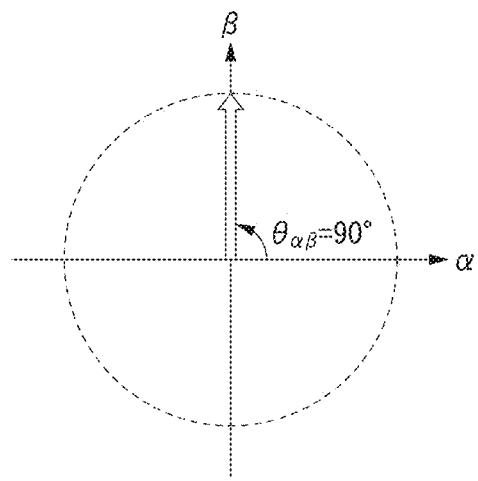
FIG. 3C
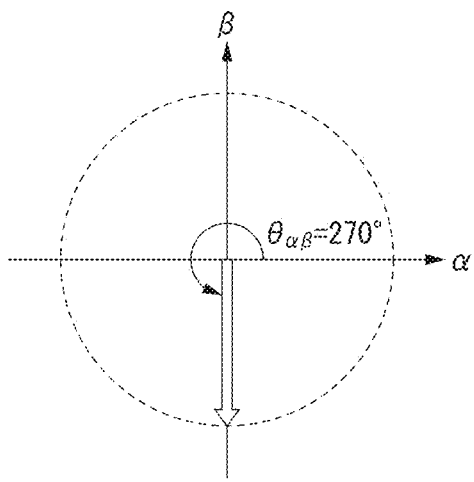
FIG. 3D
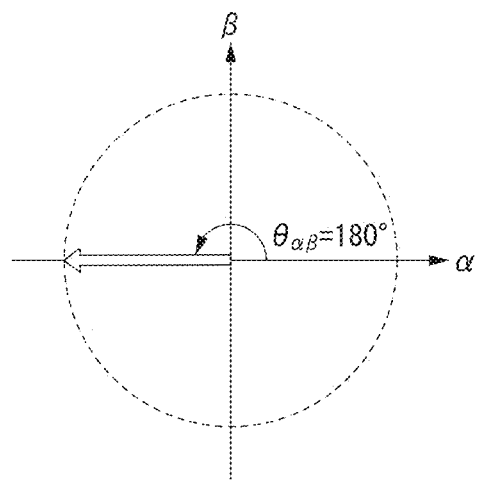
FIG. 3E
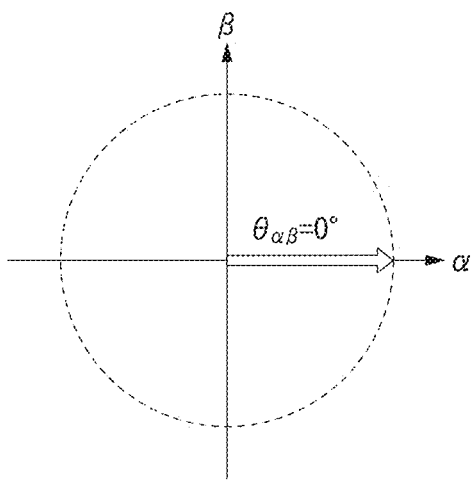

DISCHARGE CONTROL DEVICE

CROSS-REFERENCE TO RELATED APPLICATIONS

The present application claims priority under 35 U.S.C. § 119 to Japanese Patent Application No. 2018-054702, filed on Mar. 22, 2018, the entire contents of which are incorporated herein by reference.

BACKGROUND

Field of the Invention

The present invention relates to a discharge control device.

Description of Related Art

In recent years, the number of vehicles equipped with motors with engines or motors instead of engines in use has increased on the basis of hybrid vehicles (HV) and electric vehicles (EV). Such a vehicle generally includes an inverter (a power conversion device) which converts direct current power supplied from a rechargeable battery or a battery into alternating current power to supply it to a motor, and a control device which performs rotation control of the motor by performing drive control of the inverter. A capacitor (a smoothing capacitor) for removing ripple and noise caused by the inverter is provided on an input side of the inverter.

Since a high voltage (for example, a voltage exceeding 500 V) is applied to the capacitor, when an abnormality (for example, a battery abnormality, a vehicle collision, and the like) occurs, or when the ignition is turned off, it is necessary to rapidly discharge electric charges accumulated in the capacitor by isolating a battery in terms of safety. For example, it may be necessary to lower a voltage of the capacitor to about one tenth within a short period of time of about several [sec].

Japanese Patent No. 3289567 (hereinafter, referred to as Patent Document 1) discloses an example of a discharge apparatus which is used in a control device that performs vector control of a motor by giving a d-axis current value (an exciting current component) and a q-axis current value (a torque current component) as command values. Specifically, Patent Document 1 discloses a discharge apparatus which consumes electric charges accumulated in a capacitor by windings of a motor without causing the motor to be rotated by setting the d-axis current value Id exciting the motor to non-zero while referring to a rotational position of a rotor of the motor and setting the q-axis current value Iq that gives torque to the motor to zero.

SUMMARY

In the discharge apparatus disclosed in Patent Document 1, the q-axis current value Iq needs to be set to zero in accordance with the rotational position of the rotor of the motor detected by a sensor to discharge a capacitor without causing the motor to be rotated. For this reason, for example, when an abnormality occurs in the sensor which detects the rotational position of the rotor of the motor, the q-axis current value Iq cannot be set to zero, and there is a problem in that it is difficult to discharge a capacitor without causing the motor to be rotated.

Aspects of the present invention were made in view of the above circumstances, and an object of the present invention is to provide a discharge control device capable of reliably causing a capacitor to be discharged even when an abnormality occurs in a sensor that detects a rotational position of a rotor of a motor.

In order to solve the above problems, the present invention adopts the following aspects.

(1) According to one aspect of the present invention, a discharge control device which performs discharging of a capacitor, in a state in which a battery is not connected to an inverter that drives a motor, by causing electric charges accumulated in the capacitor connected to the inverter to be consumed by windings of the motor performs discharging of the capacitor by sequentially generating command values for voltages applied to a α axis and a β axis while causing a voltage phase in a αβ stationary coordinate system having a rotation axis of the rotor of the motor as an origin and defined by the α axis and the β axis orthogonal to each other to be inverted in a predefined period.

(2) In the discharge control device according to the aspect of (1), a voltage phase output unit configured to output a voltage phase in the αβ stationary coordinate system on the basis of a voltage phase table where a voltage phase inverted in the period is predefined; and a voltage command value generation unit configured to generate command values for voltages applied to the α axis and the β axis on the basis of the voltage phase output from the voltage phase output unit may further be included.

(3) In the discharge control device according to the aspect of (1) or (2), a first control to perform the discharging of the capacitor by sequentially generating command values for voltages applied to the α axis and the β axis while causing a first voltage phase in the αβ stationary coordinate system to be inverted in the period, and a second control to perform the discharging of the capacitor by sequentially generating command values for voltages applied to the α axis and the β axis while causing a second voltage phase that is orthogonal to the first voltage phase to be inverted in the period may be repeatedly performed until a voltage of the capacitor is equal to or less than a predefined threshold voltage.

(4) In the discharge control device according to the aspect of (3), the first voltage phase and the second voltage phase may be set such that a sum of currents flowing in the α axis and the β axis is zero during one cycle period in which the first control and the second control are performed.

(5) In the discharge control device according to any one aspect of (1) to (4), the period may be set to time shorter than a mechanical time constant of the motor.

According to the aspects of the present invention, it is possible to reliably cause a capacitor to be discharged even when an abnormality occurs in a sensor that detects a rotational position of a rotor of a motor.

BRIEF DESCRIPTION OF THE DRAWINGS

FIG. 3A-FIG. 3E is a diagram for describing a voltage phase table used in an embodiment of the present invention.

DETAILED DESCRIPTION OF THE INVENTION

Figure 1:
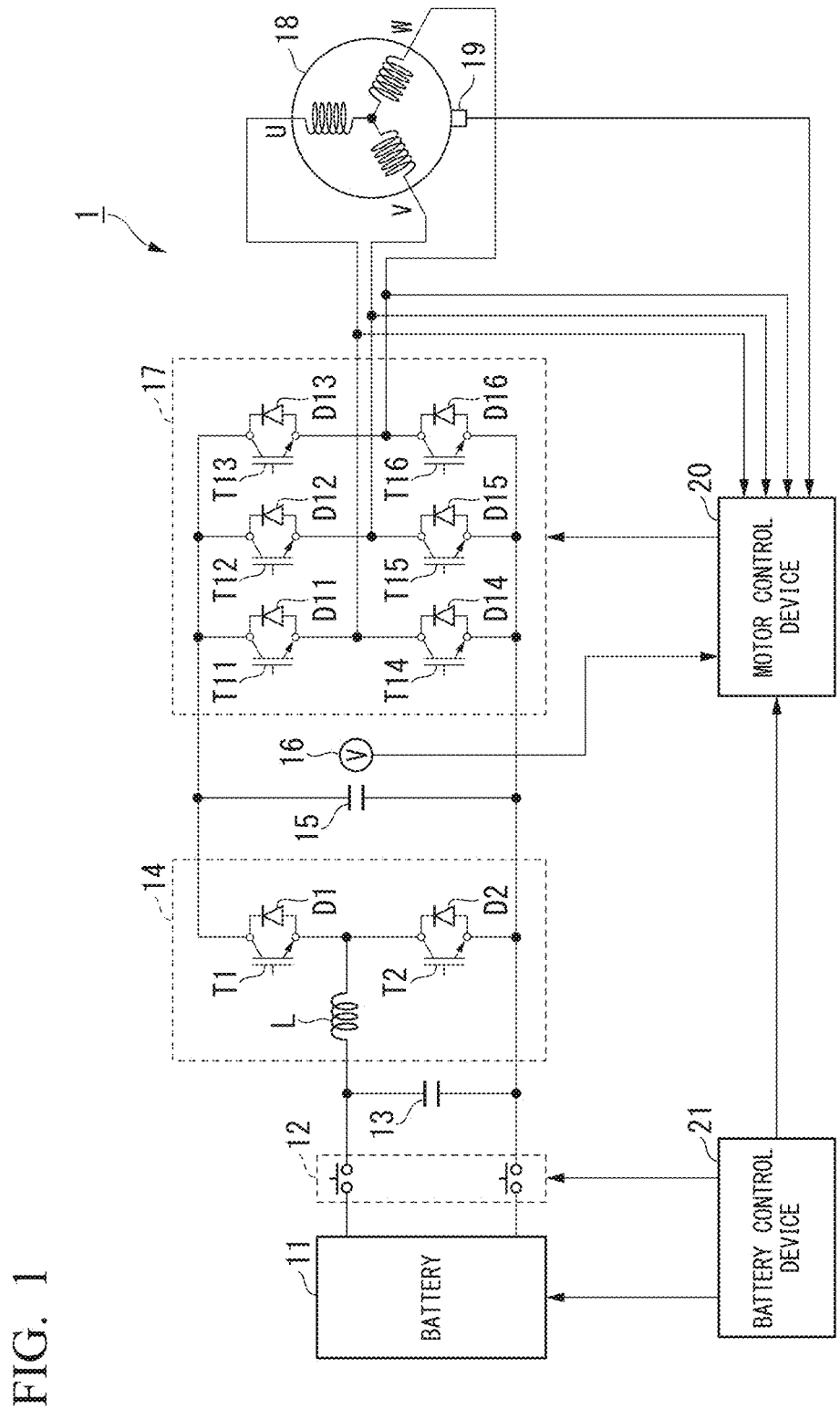
FIG. 1 is a diagram which shows a configuration of a drive control system of a motor of a vehicle in which a discharge control device according to an embodiment of the present invention is provided.

Hereinafter, a discharge control device according to an embodiment of the present invention will be described in detail with reference to drawings. FIG. 1 is a diagram which shows a configuration of a drive control system of a motor of a vehicle in which the discharge control device according to an embodiment of the present invention is provided. Incidentally, a vehicle shown in FIG. 1 is, for example, a vehicle including a running motor such as a hybrid vehicle or an electric vehicle.

As shown in FIG. 1, a vehicle 1 is provided with a battery 11, a contactor 12, a capacitor 13, a boost converter 14, a capacitor 15, a voltage sensor 16, an inverter 17, a motor 18, a rotational position detection sensor 19, a motor control device 20, and a battery control device 21. The battery 11 is, for example, a rechargeable secondary battery such as a lithium ion battery, and charge and discharge control thereof is performed by the battery control device 21. The contactor 12 connects the battery 11 to the boost converter 14 or disconnects the battery 11 from the boost converter 14 under control by the battery control device 21.

The capacitor 13 is a smoothing capacitor provided on a primary side (a battery 11 side) of the boost converter 14. The boost converter 14 includes a reactor L, switching elements T1 and T2 connected in series, and diodes D1 and D2 connected in parallel in a reverse direction to that of the switching elements T1 and T2. An insulated gate bipolar transistor (IGBT) can be used for the switching elements T1 and T2.

The boost converter 14 boosts power from the battery 11 and supplies it to the inverter 17 or steps down power from the inverter 17 and supplies it to the battery 11 by the switching element T1 and T2 being turned on or off, for example, according to control of the motor control device 20. The capacitor 15 is a smoothing capacitor provided on a secondary side (an inverter 17 side) of the boost converter 14. The voltage sensor 16 is a sensor that is attached between terminals of the capacitor 15 and detects a voltage of the capacitor 15.

The inverter 17 includes switching elements T11 to T16, and diodes D11 to D16 connected in parallel in a reverse direction to that of the switching elements T11 to T16. In addition, an IGBT can be used for the switching elements T11 to T16. Among the switching elements T11 to T16 provided in the inverter 17, switching elements T11 and T14 are connected in series to form a pair, switching elements T12 and T15 are connected in series to form a pair, and switching elements T13 and T16 are connected in series to form a pair.

Windings of three phases (a U-phase, a V-phase, and a W-phase) of the motor 18 are connected to each of connection points of the switching elements T11 to T16 which form pairs. Accordingly, it is possible to form a rotational magnetic field in winding of the three phases of the motor 18 by adjusting a proportion of ON times of the switching elements T11 to T16 which form pairs in a state in which a voltage is applied to the inverter 17. As a result, the motor 18 can be rotationally driven.

The motor 18 is, for example, a known synchronous generator motor including a rotor in which a permanent magnet is embedded and a stator around which the winding of three phases is wound. The rotational position detection sensor 19 is a sensor which detects a rotational position of a rotor of the motor 18. The battery control device 21 performs the charge and discharge control of the battery 11 and control of the contactor 12. Specifically, the battery control device 21 controls the contactor 12 such that the battery 11 and the boost converter 14 are disconnected from each other and outputs a discharge command signal to the motor control device 20 when an abnormality of the vehicle 1 (for example, a battery abnormality, a vehicle collision, and the like) occurs, or when the ignition is turned off. The motor control device 20 performs rotation control of the motor 18 by performing drive control of the inverter 17. In addition, the motor control device 20 performs discharge control to quickly discharge electric charges accumulated in the capacitor 15 when the discharge command signal output from the battery control device 21 is input.

Figure 2:
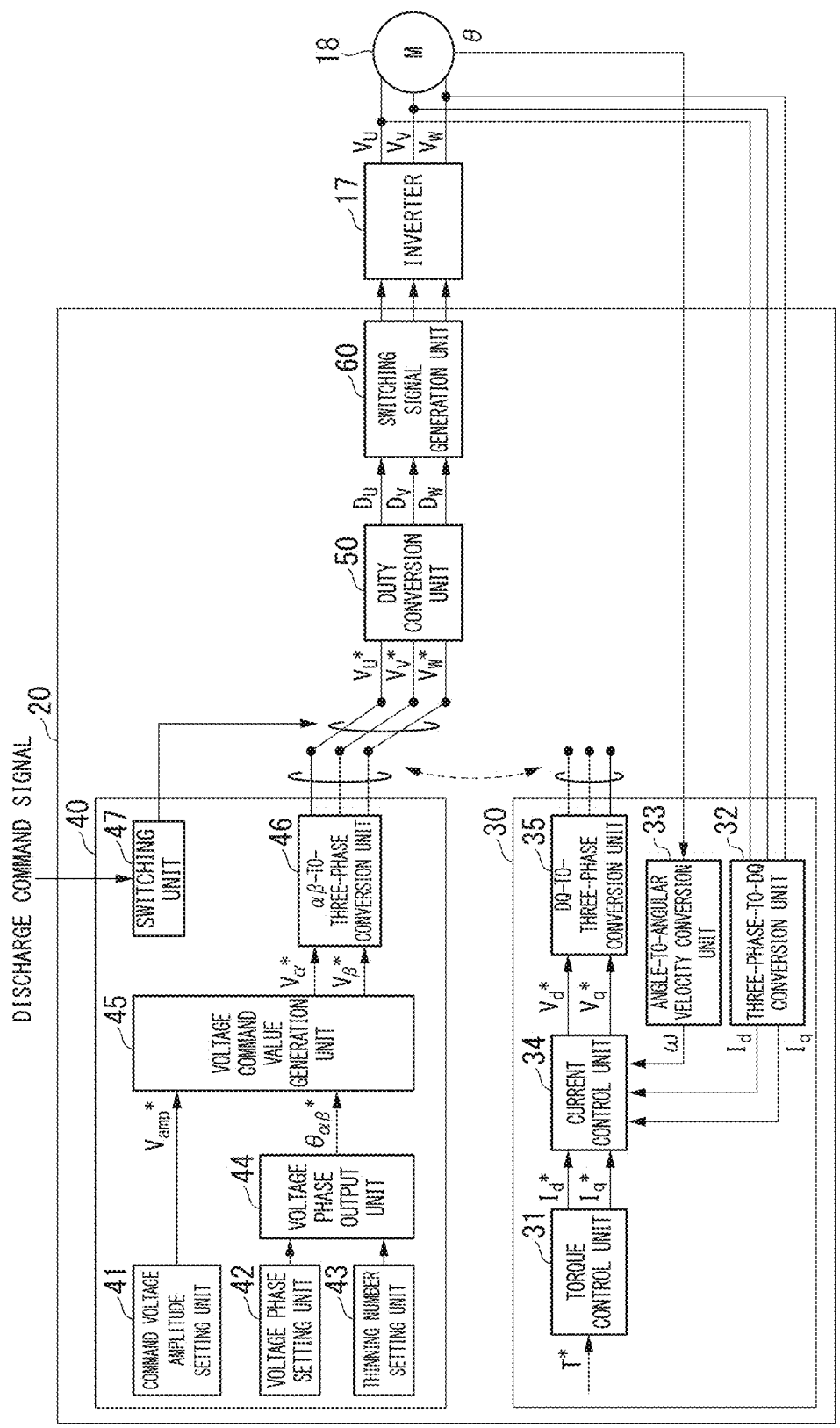
FIG. 2 is a block diagram which shows an internal configuration of a motor control device shown in FIG. 1.

FIG. 2 is a block diagram which shows an internal configuration of the motor control device shown in FIG. 1. As shown in FIG. 2, the motor control device 20 includes a drive control device 30, a discharge control device 40, a duty conversion unit 50, and a switching signal generation unit 60. The drive control device 30 performs torque control of the motor 18 in a state in which the battery 11 is connected to the boost converter 14 by the contactor 12 (a state in which the battery 11 is connected to the inverter 17). The discharge control device 40 performs discharge control of the capacitor 15 using the winding of the motor 18 by causing a current to flow such that the motor 18 does not rotate in a state in which the battery 11 is not connected to the boost converter 14 (a state in which the battery 11 is not connected to the inverter 17) by the contactor 12. Hereinafter, details of the drive control device 30 and the discharge control device 40 will be described in order.

The drive control device 30 includes a torque control unit 31, a three-phase-to-dq conversion unit 32, an angle-to-angular velocity conversion unit 33, a current control unit 34, and a dq-to-three-phase conversion unit 35, and performs vector control of the motor 18 using a dq rotary coordinate system, and performs torque control of the motor 18. Here, the dq rotary coordinate system is a rotary coordinate system having a rotation axis of the rotor of the motor 18 set as an origin and defined by a d axis and a q axis orthogonal to each other.

The torque control unit 31 calculates a d-axis current command value $I_d^*$ and a q-axis current command value $I_q^*$ on the basis of an input torque command signal $T^*$. The torque command signal $T^*$ is a command signal of torque to be generated by the motor 18, and the d-axis current command value $I_d^*$ is a command value of a current to flow on the d-axis, and the q-axis current command value $I_q^*$ is a command value of a current to flow on the q-axis.

The three-phase-to-dq conversion unit 32 converts detection values (current detection values $I_U$, $I_V$, $I_W$) of current flowing in the winding of three phases (the U-phase, the V-phase, and the W-phase) of the motor 18 into a detection value (the d-axis current detection value $I_d$) of a current on the d-axis and a detection value (a q-axis current detection value $I_q$) of a current on the q-axis. The angle-to-angular velocity conversion unit 33 converts a detection result of the rotational position detection sensor 19 (a rotational position θ of the rotor of the motor 18) into an angular velocity ω of the rotor of the motor 18.

The current control unit 34 calculates a d-axis voltage command value $V_d^*$ and a q-axis voltage command value $V_q^*$ on the basis of the d-axis current command value $I_d^*$ and the q-axis current command value $I_q^*$ output from the torque control unit 31, the d-axis current detection value $I_d$ and the q-axis current detection value $I_q$ converted by the three-phase-to-dq conversion unit 32, and the angular velocity ω of the rotor of the motor 18 converted by the angleto-angular velocity conversion unit 33. The d-axis voltage command value $V_d^*$ is a command value of a voltage to be applied to the d-axis, and the q-axis voltage command value $V_q^*$ is a command value of a voltage to be applied to the q-axis.

The dq-to-three-phase conversion unit 35 converts the d-axis voltage command value $V_d^*$ and the q-axis voltage command value $V_q^*$ output from the current control unit 34 into command values (voltage command values $V_u^*$, $V_v^*$, $V_w^*$) of voltages to be applied to the winding of the three phases (the U-phase, the V-phase, the W-phase) of the motor 18.

The discharge control device 40 includes a command voltage amplitude setting unit 41, a voltage phase setting unit 42, a thinning number setting unit 43, a voltage phase output unit 44, a voltage command value generation unit 45, a αβ-to-three-phase conversion unit 46, and a switching unit 47, and performs discharge control of the capacitor 15 using a αβ stationary coordinate system. Here, the stationary coordinate system is a stationary coordinate system having the rotation axis of the rotor of the motor 18 set as an origin and defined by a α axis and αβ axis orthogonal to each other. Specifically, the discharge control device 40 performs discharging of the capacitor 15 by sequentially generating command values for voltages applied to the α axis and the β axis while causing a voltage phase in the αβ stationary coordinate system to be inverted in a predefined period Tc (refer to FIG. 4A-FIG. 4B).

Here, the period Tc described above is set to, for example, a time shorter than a mechanical time constant of the motor 18 (time required until the rotation of the motor 18 is started after a voltage is applied to the motor 18). The period Tc is set to time shorter than the mechanical time constant of the motor 18, and thereby a current in an inverse direction can flow through the motor 18 before a current flows through the motor 18 and the motor 18 starts moving. As a result, it is possible to suppress the rotation of the motor 18 to suppress vibration and noise.

The command voltage amplitude setting unit 41 sets a command signal (a voltage amplitude command signal $V_{amp}^*$) of a voltage amplitude to be applied to the α axis and the β axis in the αβ stationary coordinate system. The voltage phase setting unit 42 sets a voltage phase when the capacitor 15 is discharged. Specifically, the voltage phase setting unit 42 sets a voltage phase when the capacitor 15 is discharged using a voltage phase table (refer to FIG. 3A where a voltage phase inverted in the predefined period Tc is predefined.

FIG. 3A-FIG. 3E is a diagram for describing the voltage phase table used in an embodiment of the present invention. As shown in FIG. 3A, the voltage phase table is a table in which phase information indicating a voltage phase is stored at a uniquely determined address. In the example shown in FIG. 3A, pieces of phase information of "90°," "270°," "270°," "90°," "180°," "0°," "0°," and "180°" are stored at addresses "0" to "7" in this order. The phase information stored in the voltage phase table is based on the α axis (set as 0°).

The phase information of "90°" described above is information indicating a positive direction of the β axis as shown in FIG. 3B, and the phase information of "270°" described above is information indicating a negative direction of the β axis as shown in FIG. 3C. In addition, the phase information of "180°" described above is information indicating a negative direction of the α axis as shown in FIG. 3D, and the phase information of "0°" described above is information indicating a positive direction of the α axis as shown in FIG. 3E.

That is, the phase information of "270°" which is obtained by inverting the phase information of "90°" stored at an address "0" is stored at an address "1", and the phase information of "90°" which is obtained by inverting the phase information of "270°" stored at an address "2" is stored at an address "3" in the voltage phase table shown in FIG. 3A. Moreover, the phase information of "0°" which is obtained by inverting the phase information of "180°" stored at an address "4" is stored at an address "5", and the phase information of "180°" which is obtained by inverting the phase information of "0°" stored at an address "6" is stored at an address "7."

When the voltage phase table shown in FIG. 3A is used, voltage phases "90°," "270°," "270°," "90°," "180°," "0°," "0°," and "180°" are repeatedly set in this order by the voltage phase setting unit 42. Note that the voltage phase table shown in FIG. 3A is merely one example, and any table other than the voltage phase table shown in FIG. 3A can be used as long as the table is where a voltage phase inverted in the predefined period Tc described above is predefined. The thinning number setting unit 43 sets the number of times (thinning number N) of continuously referring to the same address of the voltage phase table.

The voltage phase output unit 44 outputs a command value of a voltage phase (a voltage phase command value $θ_{αβ}^*$) on the basis of a voltage phase set by the voltage phase setting unit 42 and a thinning number N set by the thinning number setting unit 43. For example, the voltage phase output unit 44 may repeatedly output the voltage phases "90°," "270°," "270°," "90°," "180°," "0°," "0°," and "180°" in this order when the thinning number N is "1." In addition, the voltage phase output unit 44 may repeatedly output the voltage phases "90°" "90°" "270°," "270°," "270°," "270°," "90°" "90°" "180°," "180°," "0°" "0°" "0°," "0°," "180°," and "180°" because the same address of the voltage phase table is continuously referred to twice when the thinning number N is "2."

In the following description, a period in which a voltage phase is repeated is referred to as "one cycle period Tr" (refer to FIG. 4A-FIG. 4B). This one cycle period Tr varies depending on the thinning number. For example, the one cycle period Tr when the thinning number N is "2" is twice as long as the one cycle period Tr when the thinning number N is "1."

A voltage phase stored in the voltage phase table described above is set such that a sum (vector sum) of currents flowing in the α axis and the β axis during the one cycle period Tr is zero. If the current flow during the one cycle period Tr is zero, since torque generated in the motor 18 due to the flowing of the currents also becomes zero, the motor 18 does not rotate.

The voltage command value generation unit 45 generates command values for voltages applied to the α axis and the β axis (voltage command values $V_α^*$ and $V_β^*$) on the basis of a voltage amplitude command signal $V_{amp}^*$ set by the command voltage amplitude setting unit 41 and a voltage phase command value $θ_{αβ}^*$ output from the voltage phase output unit 44. The αβ-to-three-phase conversion unit 46 converts the voltage command values $V_α^*$ and $V_β^*$ generated by the voltage command value generation unit 45 into the command values (voltage command values $V_u^*$, $V_v^*$, and $V_w^*$) of voltages to be applied to the winding of the three phases (the U-phase, the V-phase, and the W-phase) of the motor 18.

The switching unit 47 switches a control of the drive control device 30 for driving a vehicle to a control of the discharge control device 40 for discharging an electric charge of the capacitor 15 when a discharge command signal is input from the outside. For example, when a discharge command signal is input to the motor control device 20 from the battery control device 21, the switching unit 47 may switch from the dq-to-three-phase conversion unit 35 to the αβ-to-three-phase conversion unit 46 for calculation of the voltage command values $V_u^*$, $V_v^*$, and $V_w^*$ input to the duty conversion unit 50.

The duty conversion unit 50 calculates duty values ($D_u$, $D_v$, and $D_w$) which control a switching element on the basis of the voltage command values $V_u^*$, $V_v^*$, and $V_w^*$ output from the dq-to-three-phase conversion unit 35 or the αβ-to-three-phase conversion unit 46. The switching signal generation unit 60 generates a pulse width modulation (PWM) signal on the basis of the duty values ($D_u$, $D_v$, and $D_w$) calculated by the duty conversion unit 50. The motor control device 20 controls the inverter 17 on the basis of a PWM signal generated by the switching signal generation unit 60. As a result, each of three-phase drive voltages $V_u$, $V_v$, and $V_w$ is output from the inverter 17 and is applied to the winding of the three phases (the U-phase, the V-phase, and the W-phase) of the motor 18.

Next, an operation of the vehicle 1 in the above configuration will be described. If an ignition switch of the vehicle 1 is operated, the motor 18 is driven by control of the drive control device 30 provided in the motor control device 20. At a normal time when the abnormality of the vehicle 1 has not occurred, for example, a torque command signal T* in accordance with a depression amount of an accelerator pedal is generated, and torque control of the motor 18 is performed by vector control using the dq rotary coordinate system in the drive control device 30. On the other hand, when the abnormality of the vehicle 1 (for example, a battery abnormality, a vehicle collision, and the like) occurs, or when the ignition is turned off, first, the contactor 12 is controlled by the battery control device 21, such that connection between the battery 11 and the boost converter 14 is released. Next, a discharge command signal is output to the motor control device 20 from the battery control device 21. If the discharge command signal output from the battery control device 21 is input to the motor control device 20, the switching unit 47 switches the motor control device 20 such that the discharge control device 40 performs discharge control of the capacitor 15 to prevent the motor 18 from rotating.

If the motor control device 20 is switched by the switching unit 47, the voltage phase command value θαβ* based on a voltage phase set by the voltage phase setting unit 42 and the thinning number N set by the thinning number setting unit 43 are sequentially output from the voltage phase output unit 44 in the discharge control device 40. For simplicity of description, it is assumed that the thinning number N is "1." Then, the voltage command values $V_α^*$ and $V_β^*$ based on the voltage phase command value θαβ* sequentially output from the voltage phase output unit 44 and the voltage amplitude command signal $V_{amp}^*$ set by the command voltage amplitude setting unit 41 are generated by the voltage command value generation unit 45.

The voltage command values $V_α^*$ and $V_β^*$ generated by the voltage command value generation unit 45 are converted into the voltage command values $V_u^*$, $V_v^*$, and $V_w^*$ by the αβ-to-three-phase conversion unit 46. The voltage command values $V_u^*$, $V_v^*$, and $V_w^*$ output from the αβ-to-three-phase conversion unit 46 are converted into the duty values ($D_u$, $D_v$, and $D_w$) converted by the duty conversion unit 50. The duty values ($D_u$, $D_v$, and $D_w$) converted by the duty conversion unit 50 are converted into pulse width modulation (PWM) signals by the switching signal generation unit 60.

The motor control device 20 controls the inverter 17 on the basis of a PWM signal generated by the switching signal generation unit 60, and thereby a current based on the electric charges accumulated in the capacitor 15 flow in the winding of the three-phases (the U-phase, the V-phase, and the W-phase) of the motor 18 and is consumed. Such an operation is performed, and then discharge of the capacitor 15 is performed. The above is an outline of the operation performed by the discharge control device 40, and details of the operation performed by the discharge control device 40 will be described next.

Figure 4A:
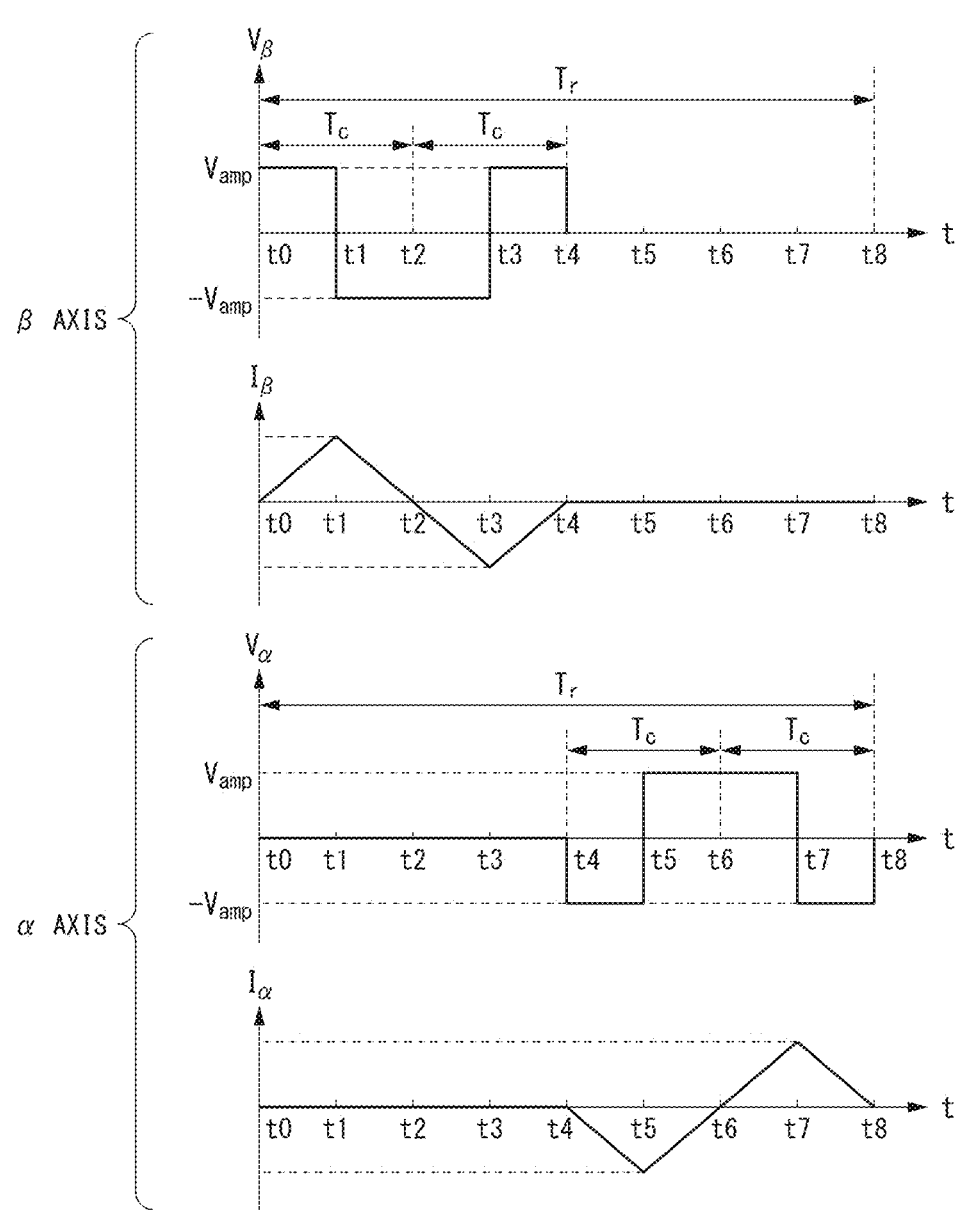
FIG. 4A-FIG. 4B is a diagram for specifically describing an operation of the discharge control device according to an embodiment of the present invention.
Figure 4B:
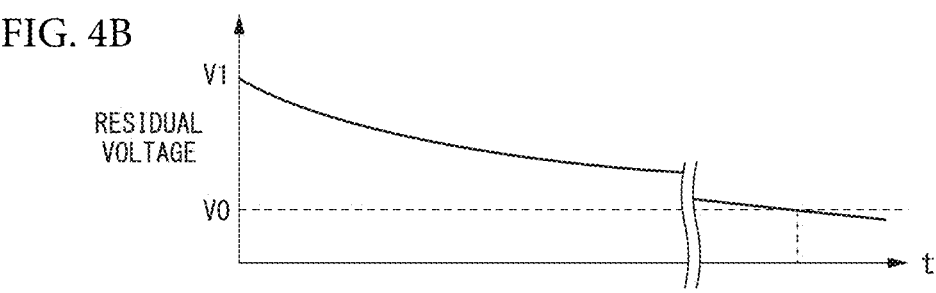

FIG. 4A-FIG. 4B is a diagram for specifically describing an operation of the discharge control device according to an embodiment of the present invention. Here, it is assumed that the voltage phase table shown in FIG. 3A is used by the voltage phase setting unit 42. Since the phase information of "90°" is stored at the address "0" of the voltage phase table shown in FIG. 3A, the voltage command values $V_α^*$ and $V_β^*$ initially generated by the voltage command value generation unit 45 cause the voltage $V_{amp}$ to be applied to the β axis. If these voltage command values $V_α^*$ and $V_β^*$ are output from the voltage command value generation unit 45, as shown in FIG. 4A, the voltage $V_{amp}$ is applied to the β axis, and as a result, a current $I_β$ flows in the β axis in a positive direction in which a current value gradually increases (time t0 to t1).

Since the phase information of "270°" which is obtained by inverting the phase information of "90°" of the address "0" is stored at the address "1" of the voltage phase table shown in FIG. 3A, the voltage command values $V_α^*$ and $V_β^*$ generated next by the voltage command value generation unit 45 cause a voltage $-V_{amp}$ to be applied to the β axis. These voltage command values $V_α^*$ and $V_β^*$ are output from the voltage command value generation unit 45, and thereby the voltage $-V_{amp}$ is applied to the β axis as shown in FIG. 4A, and as a result, the current $I_β$ flowing in the β axis in the positive direction gradually decreases and the current value finally becomes zero (time t1 to t2).

Since the phase information of "270°" is stored at the address "2" of the voltage phase table shown in FIG. 3A like the address "1", the voltage $-V_{amp}$ is continuously applied to the β axis, as shown in FIG. 4A. The current $I_β$ flows in the β axis in a negative direction in which the current value gradually increases (time t2 to t3).

Since the phase information of "90°" which is obtained by inverting the phase information of "270°" of the address "2" is stored at the address "3" of the voltage phase table shown in FIG. 3A, the voltage command values $V_α^*$ and $V_β^*$ next generated by the voltage command value generation unit 45 cause a voltage $-V_{amp}$ to be applied to the β axis.

If these voltage command values $V_α^*$ and $V_β^*$ are output from the voltage command value generation unit 45, as shown in FIG. 4A, the voltage $V_{amp}$ is applied to the β axis. As a result, the current value of the current $I_β$ flowing in the β axis in the negative direction gradually decreases and finally becomes zero (time t3 to t4). Control performed from time t0 to t4 described above corresponds to first control.

Since the phase information of "180°" is stored at the address "4" of the voltage phase table shown in FIG. 3A, the voltage command values $V_α^*$ and $V_β^*$ next generated by the voltage command value generation unit 45 cause a voltage $-V_{amp}$ to be applied to the α axis. These voltage command values $V_α^*$ and $V_β^*$ are output from the voltage command value generation unit 45, and thereby the voltage $-V_{amp}$ is applied to the α axis as shown in FIG. 4A, and as a result, the current $I_β$ flows in the α axis in a negative direction in which the current value gradually increases (time t4 to t5).

Since the phase information of "0°" which is obtained by inverting the phase information of "180°" of the address "4" is stored at the address "5" of the voltage phase table shown in FIG. 3A, the voltage command values $V_α*$ and $V_β*$ next generated by the voltage command value generation unit 45 are output from the voltage command value generation unit 45, and thereby the voltage $V_{amp}$ is applied to the α axis as shown in FIG. 4A. As a result, the current value of the current $I_β$ flowing in the α axis in the negative direction gradually decreases and finally becomes zero (time t5 to t6).

Since the phase information of "0°" is stored at the address "6" of the voltage phase table shown in FIG. 3A like the address "5", the voltage $V_{amp}$ is continuously applied to the α axis, as shown in FIG. 4A. The current $I_β$ flows in the α axis in a positive direction in which the current value gradually increases (time t6 to t7).

Since the phase information of "180°" which is obtained by inverting the phase information of "0°" of the address "6" is stored at the address "7" of the voltage phase table shown in FIG. 3A, the voltage command values $V_α*$ and $V_β*$ generated next by the voltage command value generation unit 45 cause the voltage $-V_{amp}$ to be applied to the α axis.

These voltage command values $V_α*$ and $V_β*$ are output from the voltage command value generation unit 45, and thereby, as shown in FIG. 4A, the voltage $-V_{amp}$ is applied to the α axis. As a result, the current value of the current $I_β$ flowing in the α axis in the positive direction gradually decreases and finally becomes zero (time t7 to t8). Control performed from time t4 to t8 described above corresponds to second control.

Thus, the one cycle period Tr of the discharge control performed by the discharge control device 40 ends. Subsequently, operation the same as the operation described above is repeated. That is, the operation performed in the one cycle period Tr is repeated. By repeating such an operation, the electric charges accumulated in the capacitor 15 are discharged, and a residual voltage of the capacitor 15 decreases as shown in FIG. 4B. If the residual voltage of the capacitor 15 is smaller than a predetermined threshold voltage V0, an operation of the discharge control device 40 ends.

As described above, in the present embodiment, the discharge control device 40 provided in the motor control device 20 is made to perform discharging of the capacitor 15 by sequentially generating command values for voltages applied to the α axis and the β axis while causing a voltage phase in the αβ stationary coordinate system to be inverted in the predefined period Tc. For this reason, even if an abnormality occurs in the rotational position detection sensor 19 that detects a rotational position of the rotor of the motor 18, the capacitor 15 can be reliably discharged.

In addition, in the present embodiment, the control (the first control) to perform discharging of the capacitor 15 while causing a voltage applied to the β axis to be inverted, and the control (the second control) to perform the discharging of the capacitor 15 while causing a voltage applied to the α axis to be inverted are alternatively performed. As a result, it is possible to reliably perform discharging of the capacitor 15 without causing the motor 18 to be rotated.

As described above, the discharge control device according to one embodiment of the present invention has been described, but the present invention is not limited to the embodiment described above, and can be freely changed within the scope of the present invention. For example, an example in which the voltage phases (90° and 270°) along the β axis and the voltage phases (0° and 180°) along the α axis are defined by the voltage phase table has been described in the embodiment described above, but a phase defined by the voltage phase table can be set to any phase if the sum (vector sum) of currents flowing in the α axis and the β axis during the one cycle period Tr is zero.

Moreover, a voltage phase θ1 set in the first control described above and a voltage phase θ2 set in the second control described above are not necessarily orthogonal to each other. For example, after the first control is performed by setting the voltage phase θ1 to 0°, the second control may also be performed by setting the voltage phase θ2 to 60°. That is, unless rotation or vibration of the motor 18 occurs during the discharging of the capacitor 15, a relationship between the voltage phase θ1 set earlier and the voltage phase θ2 set next is arbitrary.

What is claimed is:

1. A discharge control device which performs discharging of a capacitor, in a state in which a battery is not connected to an inverter that drives a motor, by causing electric charges accumulated in the capacitor connected to the inverter to be consumed by windings of the motor,
wherein discharging of the capacitor is performed by sequentially generating command values for voltages applied to a α axis and a β axis while causing a voltage phase in a αβ stationary coordinate system having a rotation axis of the rotor of the motor as an origin and defined by the α axis and the β axis orthogonal to each other to be inverted in a predefined period, and
wherein the discharge control device comprises:
a voltage phase output unit configured to output a voltage phase in the αβ stationary coordinate system on the basis of a voltage phase table where a voltage phase inverted in the period is predefined; and
a voltage command value generation unit configured to generate command values for voltages applied to the α axis and the β axis on the basis of the voltage phase output from the voltage phase output unit.

2. The discharge control device according to claim 1, wherein a first control to perform the discharging of the capacitor by sequentially generating the command values for the voltages applied to the α axis and the β axis while causing a first voltage phase in the αβ stationary coordinate system to be inverted in the period, and a second control to perform the discharging of the capacitor by sequentially generating the command values for the voltages applied to the α axis and the β axis while causing a second voltage phase that is orthogonal to the first voltage phase to be inverted in the period are repeatedly performed until a voltage of the capacitor is equal to or less than a predefined threshold voltage.

3. The discharge control device according to claim 2, wherein the first voltage phase and the second voltage phase are set such that a sum of currents flowing in the α axis and the β axis is zero during one cycle period in which the first control and the second control are performed.

4. The discharge control device according to claim 1, wherein the period is set to time shorter than a mechanical time constant of the motor.

* * * * *